Oct. 6, 1931. K. KUPFERSCHMID 1,826,006
SHEET GLASS APPARATUS
Filed April 3, 1929 2 Sheets-Sheet 1
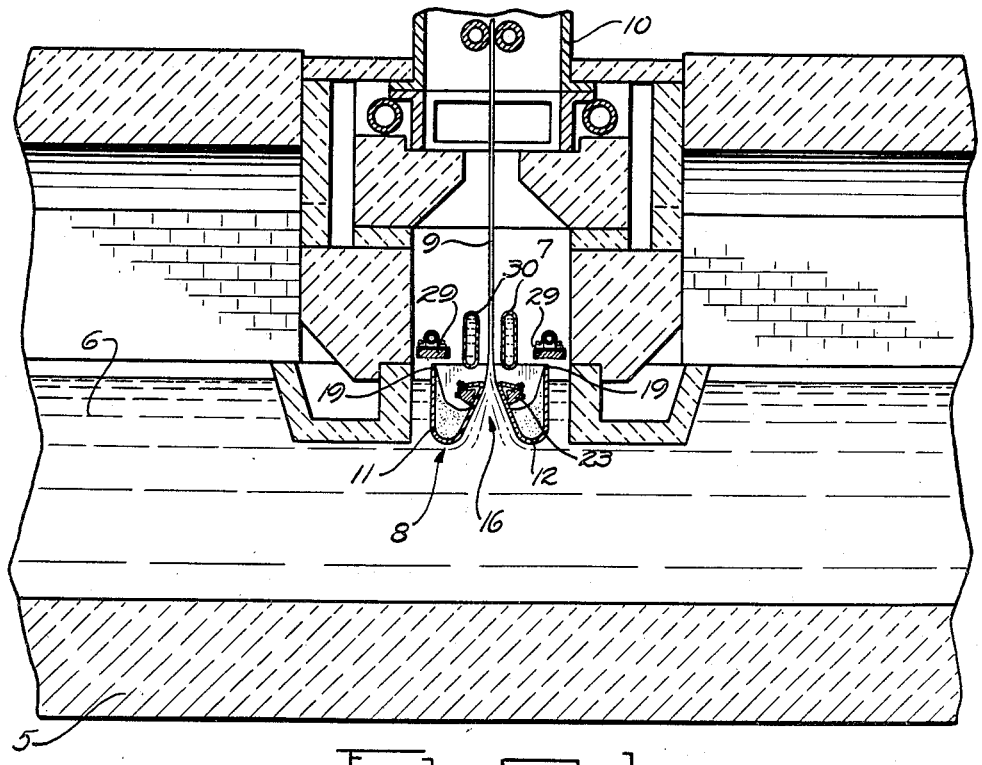
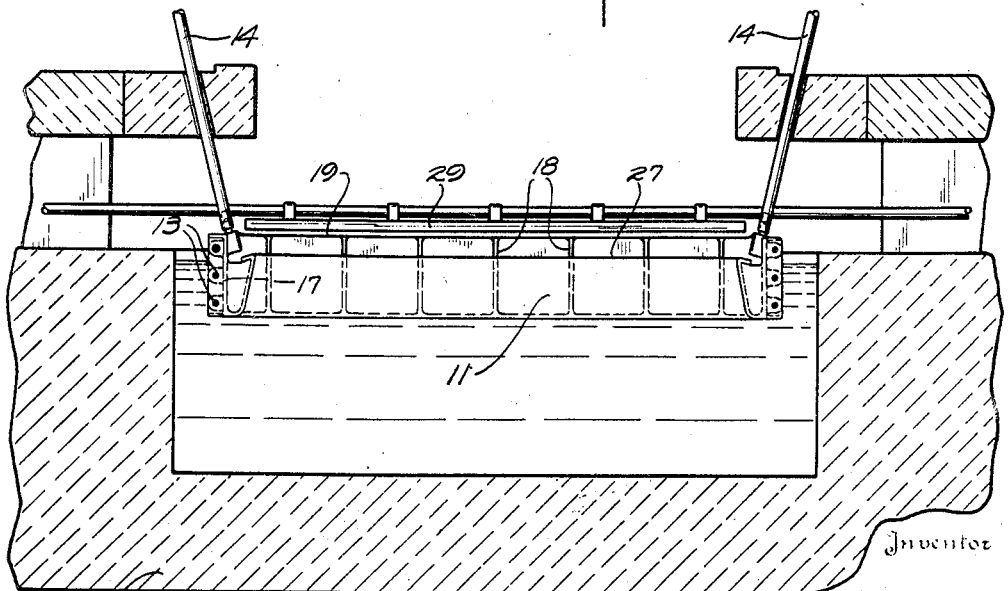
Inventor
Karl Kupferschmid
By Frank Fraser
Attorney Oct. 6, 1931.  K. KUPFERSCHMID  1,826,006
SHEET GLASS APPARATUS
Filed April 3, 1929  2 Sheets-Sheet 2
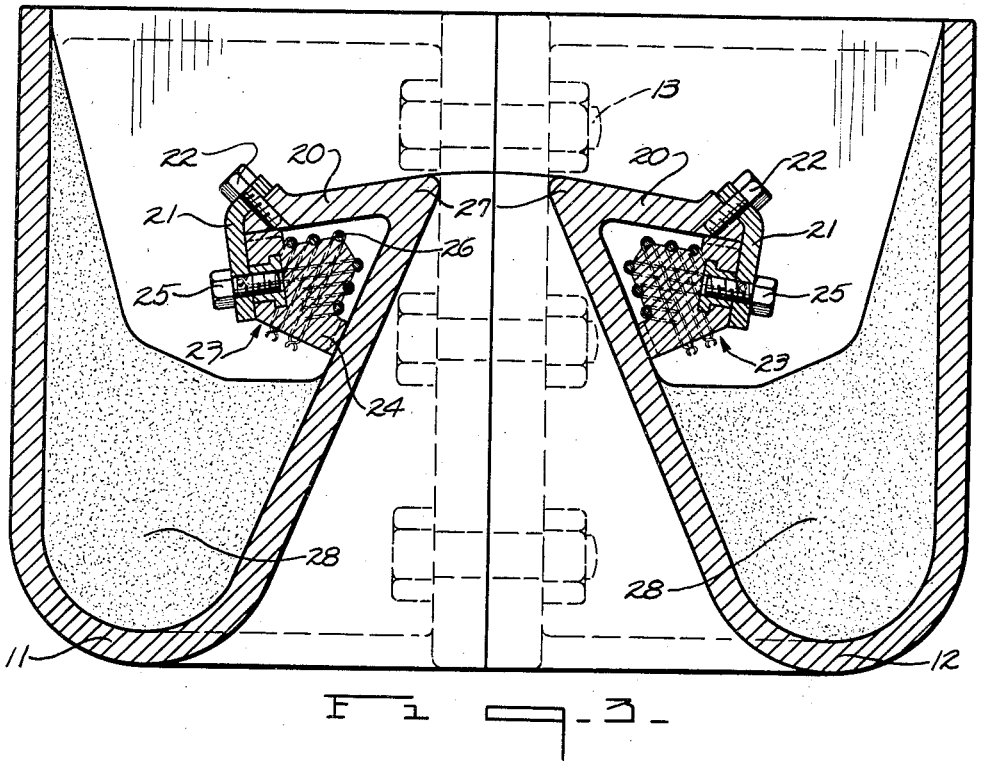
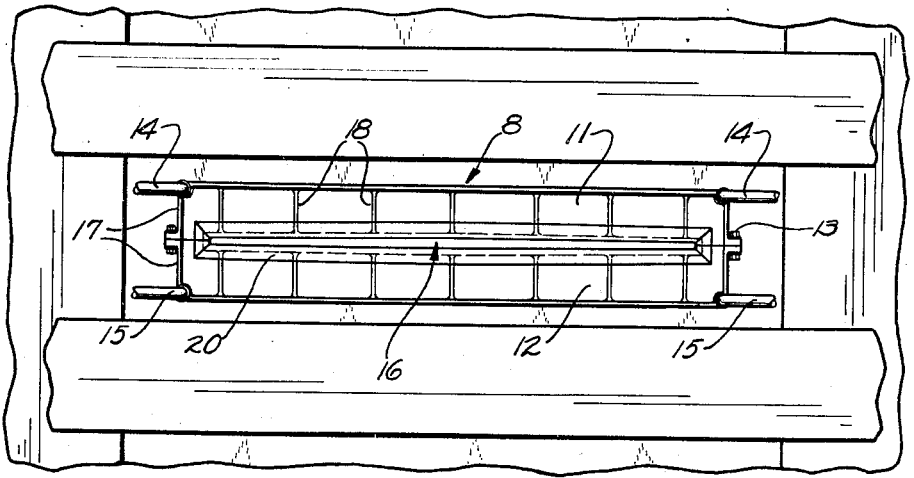
Inventor
Karl Kupferschmid
By Frank Fraser
Attorney Patented Oct. 6, 1931

1,826,006

UNITED STATES PATENT OFFICE

KARL KUPFERSCHMID, OF TOLEDO, OHIO, ASSIGNOR TO LIBBEY-OWENS-FORD GLASS COMPANY, OF TOLEDO, OHIO, A CORPORATION OF OHIO

SHEET GLASS APPARATUS

Application filed April 3, 1929. Serial No. 352,111.

The present invention relates broadly to the manufacture of sheet glass, and more particularly to improvements in apparatus for drawing sheet glass according to what is known as the "Fourcault" process.

In the drawing of sheet glass in accordance with such process, a slotted member ordinarily termed a "deputer" or "debiteuse" is immerged within a mass of molten glass in a manner that the glass will be forced upwardly into the slot thereof by the head pressure of the molten mass. The glass forced upwardly into the said slot creates a sheet source from which the sheet is drawn, said sheet being drawn vertically and annealed while traveling vertically.

An important object of this invention resides in the provision of a deputer of improved construction which will permit a sheet of glass to be drawn through the slot thereof without in any way destroying the outer surfaces of the glass.

Another object of the invention is the provision of a deputer of novel design having associated therewith means whereby the said deputer can be maintained more nearly at a desired uniform temperature than heretofore, and whereby loss of heat therefrom by radiation may be minimized.

Another object of the invention is to provide a deputer so constructed that the walls of the slot through which the sheet is drawn may be maintained at a more nearly uniform temperature throughout the length thereof whereby to facilitate and improve the drawing operation and the quality of sheet produced.

A further object of the invention resides in the provision of a metallic deputer having heating means positioned internally thereof for effecting a localized heating of the upper edges or lips of the slot whereby these portions of said slot may be maintained at a more nearly uniform temperature throughout the length thereof than has been possible in the past with the type of deputers ordinarily used.

Other objects and advantages of the invention will become more apparent during the course of the following description when taken in connection with the accompanying drawings.

In the drawings forming a part of this application and wherein like numerals are employed to designate like parts throughout the same, Fig. 1 is a vertical longitudinal section through one type of drawing apparatus showing the improved deputer provided by the present invention in use therewith.

Fig. 2 is a transverse section therethrough showing the deputer in elevation.

Fig. 3 is a transverse section through the deputer, and

Fig. 4 is a top plan view thereof.

In the apparatus illustrated in the drawings, 5 designates a tank of conventional form and construction containing molten glass 6 conveyed thereto from a melting furnace (not shown). The numeral 7 designates the drawing well within which is arranged the deputer or debiteuse block provided by the present invention and herein designated in its entirety by the numeral 8. As usual, in constructions of this character, the molten glass is drawn upwardly through the float or debiteuse in sheet form as at 9 by a suitable drawing machine 10. While the present invention is illustrated in association with one particular type of drawing apparatus, it is, of course, not restricted to use in such connection.

In the past, the slotted members or deputers have ordinarily been constructed of a refractory material, but such a type of deputer has not, however, proven entirely satisfactory in all respects since the glass passing upwardly through the slot therein has tended to cause a disintegration of the walls thereof, and as a consequence the sheet drawn through the slot has had lines and other surface defects formed on its outer surfaces due to the contact of the glass with the relatively rough surfaces of the refractory member. Also, it has been difficult to maintain the walls of the slot in the refractory deputer at a constant uniform temperature throughout the length thereof. This un-uniform temperature is injurious to the drawing operation and affects the quality of sheet produced.

The aim of this invention, therefore, is to provide a deputer of improved construction by the use of which the above objectionable features may be avoided. This is herein effected by constructing the deputer of metal and in further providing means for maintaining the walls of the slot therein at a more nearly uniform temperature throughout. The sheet of glass drawn through a deputer formed from metal and so heated will be as nearly free from lines, waves and other surface defects as possible. The metal used may be of any heat resisting and preferably non-corrosive alloy so that the deputer may be immerged within the mass of molten glass from which the sheet is drawn without injuring the same.

The deputer 8 is preferably composed of the two metallic parts or sections 11 and 12 secured together at their ends by suitable fastening elements 13 to form a single unit whereby to render the deputer more easily handled and placed in position. The deputer may be secured in proper position and also raised or lowered within the molten glass as desired by means of the upwardly and outwardly projecting arms 14 and 15 carried at each end thereof.

The two parts 11 and 12 of the deputer are, of course, spaced apart throughout the greater portion of their lengths to provide a slot 16 therebetween through which the glass sheet 9 is adapted to be drawn. The opposite adjacent ends of the sections, however, abut one another as best shown in Fig. 4, to define the ends of the slot 16. When the deputer is disposed within the molten glass as illustrated, it will be apparent that the glass will be forced upwardly into the slot 16 thereof by the head pressure of the molten mass 6 to form a sheet source from which the glass sheet is drawn.

Each metallic section 11 and 12 of the deputer comprises a substantially U-shaped housing or casing closed at either end by the end wall 17 and braced by means of spaced transverse strengthening webs or plates 18. The upper outer edge of each section 11 and 12 projects upwardly slightly beyond the level of the molten glass as indicated at 19 in Fig. 1 while the upper inner edge of each section terminates at substantially the level of the molten glass and is provided with an inwardly directed substantially horizontal flange 20.

Carried at the inner end of the flange 20 of each section 10 and 11 is a depending bracket arm 21 secured thereto by bolts or the like 22, said bracket arm supporting an electric heating element or unit designated in its entirety by the numeral 23 and comprising essentially, a porcelain body or block 24 secured to the bracket arm by bolts or other suitable fastening means 25 and carrying the resistance wires 26. It is believed that the operation of this type of electric heating unit will be readily understood without further explanation. The heating units are preferably disposed as shown, in the upper inner corners of the respective deputer sections and beneath the flanges 20. By arranging the units in this manner, they will serve to effect a localized heating of the upper edges of the walls of the slot 16 and more particularly the opposed lips 27 and thus maintain the upper portions of the walls of the slot at a more nearly uniform temperature throughout their length than heretofore. Arranged within the cavity formed in each section of the deputer is the insulating material 28 while preferably positioned above the deputer, in spaced relation thereto at each side of the sheet, is an electric heating unit 29. These heating units are provided to direct heat downwardly upon the upwardly projecting portions 19 of the deputer. As the sheet 9 is drawn upwardly, it is passed between the two internally cooled shields or bodies 30.

By constructing the deputer in the manner above described, it will be apparent that when the same is immerged within the molten glass, the amount of metallic surface exposed to the atmosphere will be minimized and that means is provided for applying heat to those surfaces which must of necessity be exposed. The insulating material 28 is provided to prevent or greatly retard the loss of heat through radiation from those portions of the deputer submerged in the molten glass, while the electric heaters are adapted to apply heat to the exposed portions thereof. By providing the electric heating units 23, the opposed lips 27 and upper portions of the walls of the slot 16 can be maintained at a more nearly uniform and constant temperature throughout the length thereof. Also, by providing a deputer of the character described, in combination with the heating means specified, all portions of the deputer can be maintained at a more nearly constant and uniform temperature and at a temperature more nearly equal to the temperature of the molten glass so that as the sheet is drawn, it will not come into direct contact with any cold surfaces or unevenly heated surfaces. With such an arrangement, erosion of the deputer will be avoided and the surfaces thereof with which the glass being drawn comes in contact will be kept smooth so as not to form lines and other surface defects in the sheet.

The present invention further contemplates the provision of means to prevent the glass immediately surrounding the deputer from becoming devitrified and this is herein accomplished by positioning the electric heating elements 29 so that they extend outwardly beyond the deputer as in Fig. 1 to direct heat downwardly upon the surface of the areas of molten glass which are at either side of the deputer. In this manner, the glass immediately adjacent the deputer will not become devitrified as quickly as heretofore, thus making it possible to use the deputer for a relatively longer period of time without necessitating a shut-down of the machine. The formation of dog-metal will also be retarded by the provision of the metallic deputer and the insulating material therein since loss of heat from the deputer by radiation is prevented and the deputer in this way maintained more nearly the temperature of the molten glass. In addition to heating the lips 27 of the deputer, the electric heaters 23 can also be utilized for heating the molten glass drawn upwardly through the deputer if desired. That is, if sufficient heat be generated by the electric heaters, there will be a transmission of heat from the lips 27 into the glass passing upwardly therebetween.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In sheet glass apparatus, a deputer embodying a selected member, means arranged internally thereof for heating the same, and insulating means also disposed within said member.

2. In sheet glass apparatus, a deputer embodying a slotted member, means arranged within said member for effecting a localized heating of the upper portions of the walls of the slot therein, and means for insulating the lower portions of the walls of said slot.

3. In sheet glass apparatus, a deputer embodying a slotted member having a cavity formed therein, heating means carried by said member and disposed within said cavity, and insulating means also received within the cavity.

4. In sheet glass apparatus, a deputer embodying a slotted member having a cavity at each side of the slot therein open at its upper end, electric heating units carried by said member and positioned in the upper inner corners thereof for effecting a localized heating of the upper portions of the walls of the slot, and insulating means also received within the cavities and in contact with the lower portions of the walls of said slot.

5. In sheet glass apparatus, a deputer embodying a slotted member having a cavity at each side of the slot therein open at its upper end, heating means carried by said member and disposed within each cavity for effecting a localized heating of the upper portions of the walls of the slot, and insulating means also disposed within the cavities beneath the heating means and in contact with the lower portions of the walls of said slot.

6. In sheet glass apparatus, a deputer embodying a slotted member composed of spaced side portions forming a slot therebetween, each side portion being substantially U-shaped in cross section, electric heating units carried by said portions and disposed therein adjacent the upper inner corners thereof for effecting a localized heating of the upper portions of the walls of the slot, and insulating material also disposed within each side portion beneath the heating units and in contact with the lower portions of the walls of said slot.

7. In sheet glass apparatus, a deputer embodying a slotted member composed of spaced side portions forming a slot therebetween, each side portion being substantially U-shaped in cross section and having an inwardly directed flange at the upper inner edge thereof, electric heating units carried by said flanges and positioned therebeneath in the upper inner corners of the side portions for effecting a localized heating of the upper portions of the walls of the slot, and insulating material also disposed within said side portions beneath the heating units and in contact with the lower portions of the walls of said slot.

8. In sheet glass apparatus, a deputer embodying a slotted member composed of spaced side portions forming a slot therebetween, each side portion being substantially U-shaped in cross section and having an inwardly directed flange at the upper inner edge thereof, and electric heating units carried by said flanges and positioned therebeneath in the upper inner corners of the side portions for effecting a localized heating of the upper portions of the walls of said slot.

Signed at Toledo, in the county of Lucas and State of Ohio, this 19th day of March, 1929.

KARL KUPFERSCHMID.

CERTIFICATE OF CORRECTION.

Patent No. 1,826,006.  Granted October 6, 1931, to

KARL KUPFERSCHMID.

It is hereby certified that error appears in the printed specification of the above numbered patent requiring correction as follows: Page 3, line 31, claim 1, for "selected" read slotted; and that the said Letters Patent should be read with this correction therein that the same may conform to the record of the case in the Patent Office.

Signed and sealed this 17th day of November, A. D. 1931.

(Seal)

M. J. Moore,
Acting Commissioner of Patents.